(12) United States Patent
Budaragin

(10) Patent No.: US 7,211,292 B1
(45) Date of Patent: *May 1, 2007

(54) COATINGS FOR METAL CUTTING TOOLS

(75) Inventor: Leonid V. Budaragin, Moscow (RU)

(73) Assignee: C3 Intl, LLC, Rosell, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/868,417

(22) Filed: Jun. 15, 2004

Related U.S. Application Data

(63) Continuation of application No. 09/835,453, filed on Apr. 16, 2001, now abandoned, which is a continuation-in-part of application No. 08/824,418, filed on Mar. 26, 1997, now abandoned.

(60) Provisional application No. 60/014,260, filed on Mar. 28, 1996.

(51) Int. Cl.
*B05D 3/02* (2006.01)

(52) U.S. Cl. ...................... 427/227; 427/226

(58) Field of Classification Search ................ 427/226, 427/227
See application file for complete search history.

(56) References Cited

U.S. PATENT DOCUMENTS

| | | | |
|---|---|---|---|
| 5,073,410 A * | 12/1991 | Paz-Pujalt | 427/226 |
| 5,601,869 A * | 2/1997 | Scott et al. | 427/126.3 |
| 6,620,456 B2 * | 9/2003 | Blanton et al. | 427/226 |

* cited by examiner

*Primary Examiner*—Fred J. Parker
(74) *Attorney, Agent, or Firm*—Kilpatrick Stockton LLP

(57) ABSTRACT

The method is disclosed for coating or impregnating a metal cutting tool with a metal oxide. The method includes the steps of applying a liquid metal carboxylate composition, or a solution thereof, to a substrate material, and exposing the metal cutting tool to an environment that will cause vaporization or dissipation of any excess carboxylic acids in the liquid metal carboxylate composition and conversion of the metal carboxylates to metal oxides.

19 Claims, No Drawings

COATINGS FOR METAL CUTTING TOOLS

RELATED APPLICATIONS

This application is a continuation of Ser. No. 09/835,453, filed Apr. 16, 2001, now abandoned, which is a continuation-in-part of application Ser. No. 08/824,418, filed Mar. 26, 1997, now abandoned which claims benefit of provisional application Ser. No. 60/014,260, filed Mar. 28, 1996, now abandoned, the entire contents of which are incorporated by reference.

BACKGROUND OF THE INVENTION

1. Field of the Invention

The present invention relates to a method of providing a coating or film on the surfaces of cutting tools. In particular, the invention relates to a method of coating metal cutting tools by applying to one or more surfaces of the cutting tool a composition containing a liquid metal carboxylate, followed by heat treatment of the cutting tool.

2. Description of Related Art

Cutting tools are used in many different industries, and can generally be thought of as a cutting insert (plate, drill, blade, etc.) fixed on a holder. The cutting inserts are typically made of steel and/or metal-ceramic hard alloys containing tungsten carbide, titanium carbide, tantalum carbide, and other additives. Hard-alloy materials generally contain more that 90% of metal carbides and 3–8% of metal cobalt. One method of making hard-alloy cutting inserts is baking a mixture of metal carbide powders with the metal cobalt powder in a vacuum or reductive atmosphere (argon-hydrogen mixture) at 1300–1500° C.

Cutting inserts are often coated to increase their hardness, to increase their useful life, to increase the time between sharpenings or other maintenance, to prevent fouling of the tool with the material being cut, and to provide other desirable properties, i.e. improvement of the quality of the surfacing process, efficiency increase (cutting speed.) The coatings can be applied to steel cutting inserts and to hard-alloy inserts as well.

Currently, cutting tools are typically coated in one of two ways. One method is chemical vapor deposition (CVD) of oxides, nitrides, and oxynitrides. CVD involves thermal decomposition of volatile metal chlorides (aluminum, titanium, zirconium) on the surface of a cutting tool in a controlled atmosphere containing nitrogen and some oxygen. This process is widely used by major cutting tool manufacturers, such as ISKAR (Israel), Hertel (Germany), and other manufacturers in the U.S., Sweden, Japan.

However, there are several problems associated with the CVD method. First, CVD requires the use of a carefully developed system of safety equipment, as some components used in this process, such as β-diketones and metal-carbonyl complexes, are toxic. Second, the CVD process significantly improves the adhesive properties of the coating, but the coating should be at least 5–15 micrometers thick to provide life extension of the tool. In order to prevent the coating from cracking and peeling it is necessary to match up the respective coefficients of thermal expansion of the cutting tool and the coating. This cannot always be achieved due to differences in these coefficients for the commonly used substrate materials and the common CVD coating materials. Third, the CVD method requires high material and power consumption, increasing the cost of the coated tool. Finally, use of the CVD method results in the production of toxic chloride hydrogen and metal chlorides, whose emission must be controlled from environmental and health standpoints.

The other typical method currently utilized in coating cutting tools is by magnetron spraying of the metal nitrides (using a machine known in Russia as a "Bulat" type machine). During this process a tool and a titanium target plate are placed into a bath filled with nitrogen (pressure about 0.1–1 mm Hg). The bath gets heated up, and the target gets "bombed" by accelerated electrons. Titanium sputters and reacts with nitrogen forming titanium nitride, which settles on the surface of the tool. This process requires control and thorough preparation of the surface of the tool being coated, and it is expensive because of its high material and power consumption.

Other methods for extending the life of tools exist, but cannot be considered as coating processes (for example, nitriding in an ammonia atmosphere, surface modifications in a salt melt). Spraying (plasma, detonation) is primarily used for coating parts for cars and heavy machinery.

Accordingly, there remains a need in the art for a method of coating cutting tools to extend the life of the tool while avoiding the cost and toxic materials handling problems associated with the methods described above.

SUMMARY OF THE INVENTION

This invention overcomes the drawbacks described above in known techniques for coating cutting tools. The invention provides a coating process to harden, and therefore extend the life of, cutting tools that may be used with any metal cutting tool, including but not limited to, hard-alloy and steel metal cutting tools. In the method of the invention, the surface of the cutting tool is coated with a composition of liquid metal carboxylate followed by heat treatment in non-oxidizing atmosphere at a minimum temperature of 400° C. for about 3–5 minutes thereby forming a hard oxide layer on the surface of a cutting tool. This oxide layer helps to prevent the material being cut from adhering to the cutting tool, thus improving the performance of disposable cutting inserts (e.g., plates, drills, etc.).

The invention provides a relatively inexpensive industrial method for extending the useful life of cutting tools by applying to the tools a hard and highly adhesive metal oxide coating.

The invention also minimizes the production of toxic waste during the coating process, as compared to more traditional methods of coating cutting tools, and reduces material consumption during the coating process.

These and other features and advantages of the present invention will become apparent after a review of the following detailed description of the disclosed embodiments and the appended claims.

DETAILED DESCRIPTION OF SPECIFIC EMBODIMENTS

The present invention is directed to a method of coating the surface of cutting tools or cutting tool inserts by applying to the surface a composition of one or more liquid metal carboxylates, and exposing the cutting tool to an environment that will cause vaporization or dissipation of any excess carboxylic acids, typically involving contacting the cutting tool with heat in a non-oxidizing atmosphere. This heat treatment causes conversion of the liquid metal carboxylate into one or more metal oxides, thereby forming a hard oxide layer on the surface of the cutting tool. This layer extends the life of the tool and prevents adherence of the material being cut to the cutting tool, thereby improving the performance of cutting inserts.

The term alkyl, as used herein, refers to a saturated straight, branched, or cyclic hydrocarbon, or a combination thereof, typically of $C_1$ to $C_{24}$, and specifically includes methyl, ethyl, n-propyl, isopropyl, n-butyl, isobutyl, t-butyl, n-pentyl, cyclopentyl, isopentyl, neopentyl, n-hexyl, isohexyl, cyclohexyl, 3-methylpentyl, 2,2-dimethylbutyl, 2,3-dimethylbutyl, heptyl, octyl, nonyl, and decyl.

The terms alkenyl and alkynyl, as used herein, refer to a $C_2$ to $C_{24}$ straight or branched hydrocarbon with at least one double or triple bond, respectively.

The term aryl or aromatic, as used herein, refers to phenyl, naphthyl, or substituted phenyl or naphthyl, wherein the substituent is alkyl, alkenyl, alkynyl or alkoxy.

The present invention provides a composition of liquid metal carboxylates. The liquid metal carboxylate composition is a solution of the carboxylic acid salts of one or more metals ("metal carboxylate"). Metal carboxylates are well known and can be produced by a variety of methods known to one skilled in the art. Non-limiting examples of methods for producing the metal carboxylate are shown in the following reaction schemes:

n $RCOOH + Me \rightarrow (RCOO)_n Me^{n++}$ $0.5nH_2$ (for alkaline earth metals, alkali metals and thallium);

n $RCOOH + Me^{n+}(OH)_n \rightarrow (RCOO)_n Me^{n++}$ $H_2O$ (for practically all metals having a solid hydroxide);

n $RCOOH + Me^{n+}(CO_3)_{0.5n} \rightarrow (RCOO)_n Me^{n++}$ $H_2O + 0.5n\ CO_2$ (for alkaline earth metals, alkali metals and thallium); and n $RCOOH + Me^{n+}(X)m \rightarrow (RCOO)_n Me^{n+} + n/m H_m X$ (liquid extraction, usable for practically all metals having solid salts).

The liquid metal carboxylate composition can contain a single metal, to form a single metal carboxylate, or a mixture of metals, to form a corresponding mixture of metal carboxylates. In addition, the composition may contain different carboxylate moieties. Preferably, the liquid metal carboxylate composition contains a mixture of metals, as these compositions form mixed oxides having superior properties.

Preferably, the solvent used in the liquid metal carboxylate composition is an excess of a liquid carboxylic acid which was used to form the metal carboxylate. Alternatively, the solvent can be another carboxylic acid, or a solution of a carboxylic acid in another solvent, including, but not limited to, organic solvents such as benzene, toluene, chloroform and dichloromethane.

Carboxylic acids that are suitable for use to form the liquid metal carboxylate composition are those which: (1) can form a metal carboxylate, where the metal carboxylate is soluble in excess acid or another solvent; and (2) can be vaporized in a temperature range that overlaps the oxide conversion temperature range.

The carboxylic acid should have a formula R-COOH, where R is alkyl, alkenyl, alkynyl or aryl.

Preferably, the liquid monocarboxylic acid comprises one or more carboxylic acids having the formula I below:

$$R—C(R'')(R')—COOH \qquad (I)$$

wherein:

R is selected from H or $C_1$ to $C_{24}$ alkyl groups; and

R' and R'' are each independently selected from H or $C_1$ to $C_{24}$ alkyl groups.

These alpha branched carboxylic acids typically have an average molecular weight in the range 130 to 420. More particularly, the carboxylic acids have an average molecular weight in the range 220 to 270. The carboxylic acid may also be a mixture of tertiary and quaternary carboxylic acids of formula I. VIK acids can be used as well.

Either a single carboxylic acid or a mixture of carboxylic acids can be used to form the liquid metal carboxylate. Preferably, a mixture of carboxylic acids is used. More preferably, the mixture contains 2-ethylhexanoic acid where R is H, R'' is $C_2H_5$ and R' is $C_4H_9$. Typically, this acid is the lowest boiling acid constituent in the mixture.

The use of a mixture of carboxylates provides several advantages. First, the mixture has a broader evaporation temperature range, making it more likely that the evaporation temperature of the acid mixture will overlap the metal carboxylate decomposition temperature, allowing the formation of an optimum oxide coating. Second, the production of purified individual acids is expensive. Thus, the use of an individual acid could unnecessarily raise the cost of this method.

In general, the liquid metal carboxylate mixture typically contains one metal carboxylate as its major component and one or more additional metal carboxylates which may function as stabilizing additives. The stabilizing additives are typically trivalent metal carboxylates. Exemplary trivalent metal carboxylates include chromium, iron, manganese and nickel carboxylates. The liquid metal carboxylate composition can contain both cerium and chromium carboxylates.

Metals that are particularly suitable for use to form the liquid metal carboxylates include those selected from the group consisting of: Lithium, Beryllium, Sodium, Magnesium, Potassium, Calcium, Scandium, Titanium, Chromium, Manganese, Iron, Nickel, Cobalt, Copper, Zinc, Gallium, Rubidium, Strontium, Yttrium, Zirconium, Silver, Cadmium, Tin, Cesium, Cerium, Barium, Platinum, Lanthanum, Hafnium, Vanadium, Niobium, Molybdenum, Indium, Promethium, Plutonium, Curium, Californium, Tantalum, Gold, Thallium, Lead, Bismuth, Praseodymium, Neodymium, Samarium, Europium, Gadolinium, Terbium, Dysprosium, Holmium, Erbium, Thulium, Ytterbium, Lutetium, Thorium and Uranium.

Any of the above metals or combinations thereof can be used to form coatings according to the present process. Depending on the particular cutting tool being coated, those skilled in the art can select appropriate metal mixtures to form the desired metal or metal oxide coating.

For most compositions useful in coating cutting tools, the metal forming the metal carboxylate that is the major component of the liquid metal carboxylate composition contains an amount of metal that is from about 65 to about 97% by weight, more particularly from about 80 to about 87% by weight, relative to the total weight of metal in the composition. More particularly, the metal forming the metal carboxylate which is the major component is present in an amount from about 80–87% by weight. Alternatively, the amount of metal forming the major component of the metal carboxylate composition is in the range from about 90–97% by weight, based upon the total metal present in the composition.

The metal carboxylates that may function as stabilizing additives should be present in amounts such that the total amount of the metal in metal carboxylates which are the stabilizing additives is at least 3% by weight, relative to the total weight of the metal in the liquid metal carboxylate composition. This can be achieved by using a single stabilizing additive, or multiple stabilizing additives, provided that the total weight of the metal in the stabilizing additives is greater than 3%, more particularly, the total weight of the metal in the stabilizing additives ranges from about 3% to about 35% by weight, even more particularly, the total weight range for the metal in the stabilizing additives ranges from about 3 to about 30% by weight. Even more particularly, the total weight range for the metal in the stabilizing additives ranges from about 3 to about 10% by weight. In some embodiments, the total weight range for the metal in the stabilizing additives is from about 7 to about 8%.

Non-limiting examples of liquid metal carboxylate compositions suitable for use in the invention are set forth below. In these compositions, weight range percentages for the metals are based on 100 percent total by weight of the metal in the liquid metal carboxylate composition. As noted above, the minimum amount of the stabilizing additives, those defined below as being present in "up to" a certain amount, is a total stabilizing additive weight of at least 3 percent. For example, the liquid metal carboxylate composition can have at least 3% of a single stabilizing additive or at least 1.5% of one stabilizing additive and at least 1.5% of another, or at least 2% of one stabilizing additive and at least 1% of another.

The amount of metal in the liquid metal carboxylate composition should be enough to provide an adequate metal oxide coating. Generally, this amount is in the range from about 20 to about 150 grams of metal per kilogram of liquid metal carboxylate composition. More specifically, the amount of metal in the liquid metal carboxylate composition can range from about 30 to about 50 grams of metal per kilogram of liquid metal carboxylate composition. More particularly, the liquid metal carboxylate composition can contain from about 30 to about 40 grams of metal per kg of composition.

Amounts of metal less than 20 grams per kg of composition can be used. However, this low concentration of metal may not be sufficient to obtain a non-porous coating during the first cycle of the coating process. As a result, the process will likely have to be repeated several times to provide an adequate coating.

Similarly, amounts of metal greater than 150 grams per kg of composition can be used. However, the use of more metal leads to the unnecessarily excessive material consumption, thereby raising the cost of the method of the invention.

A particular liquid metal carboxylate composition that has been found to be suitable comprises 2-ethylhexanoic acid and metal 2-ethylhexanoates (e.g., sold under the name Alfa Aesar A. by Johnson Matthey Co., 1999–2000). The mass proportions of the components are as follows (metal weight percentages are given relative to the total weight of metal in the liquid metal carboxylate composition):

| Yttrium | 3 to 10% |
| Chromium | 2 to 5% |
| Zirconium | balance |

The above metals are typically present in the liquid metal carboxylate composition in an amount ranging from about 30 grams to about 50 grams of metal per kilogram of liquid metal carboxylate, more particularly, from about 30 grams to about 40 grams of metal per kilogram of liquid metal carboxylate composition.

Another suitable liquid metal carboxylate composition comprises 2-ethylhexanoic acid and metal 2-ethylhexanoates. The mass proportions of the components are as follows (metal weight percentages are given relative to the total weight of metal in the liquid metal carboxylate composition):

| Yttrium | 7 to 8% |
| Chromium | 2 to 3% |
| Zirconium | 89 to 91% |

The above metals are preferably present in the liquid metal carboxylate composition in an amount of about 40 grams of metal per kilogram of liquid metal carboxylate composition.

As discussed above, the primary purpose of the disclosed method is the production of a metal oxide coating on the surface of a metal cutting tool. To prepare a cutting tool for coating, one can use any hydrocarbon solvent, alcohol, ketones, fluorine or chlorine containing hydrocarbons, amides, carboxylic acids, synthetic washing fluids, water steam treatment, or any other method to clean the surface of the tool of any oils, greases, dirt, or other materials that may interfere with the deposition of the metal oxide coating. The solvent is desirably allowed to evaporate from the surface of the tool. The liquid metal carboxylate composition can be applied to the metal cutting tool neat (without the use of an additional solvent) or in solution. Preferably, the liquid metal carboxylate composition is applied without a solvent. However, the cutting tool must be finished (the technological cycle of the tool manufacturing process must be completed).

Any known method of application of the liquid metal carboxylate composition is suitable for use in the present process, so long as it provides an adequate coating of the liquid metal carboxylate composition on the metal cutting tool. For example, the cutting tool component can be dipped into a container of the liquid metal carboxylate composition. Alternatively, a swab, sponge, dropper, pipet, spray, brush or other applicator can be used to apply the liquid metal carboxylate composition to the cutting tool. Other methods of application may also be acceptable.

The liquid metal carboxylate composition should be applied at a temperature less than about 50° C. Preferably, the liquid metal carboxylate composition is applied to the cutting tool at room temperature.

Following application of the liquid metal carboxylate composition to the cutting tool, the component is exposed to an environment sufficient to vaporize or dissipate excess carboxylic acid in the liquid metal carboxylate composition and to convert the metal carboxylates to metal oxides. The temperature for the treatment should be selected such that the temperature ranges for the evaporation of the carboxylic acid and the formation of the metal oxide overlap, and the temperature should not damage the component onto which the coating is being applied.

For metal cutting tools, the minimum decomposition temperature for carboxylate is about 400° C. More particularly, the temperature can range from about 400 to about 650° C. Even more particularly, the temperature range is from about 400 to about 550° C. With hard alloy materials, the metal carbides can survive much higher temperatures (up to about 900° C.) and retain their properties, such as hardness. As a result, cutting tools made of such materials can be treated at higher temperatures, allowing the carboxylate decomposition/metal oxide formation process to be accelerated. By contrast, cutting tools made of steel will lose some of their desirable properties (microhardness of the tool) at temperatures exceeding 500° C. As a result, the heat treatment cycle of such cutting tools should not exceed 450° C.

During the exposure step of the process, two subprocesses are believed to take place (although the inventor does not wish to be bound by any theory of the mechanism by which the method functions). These subprocesses can occur at different temperature levels. The first subprocess is the evaporation or decomposition of any excess carboxylic acid or other solvent in the liquid metal carboxylate composition. This forms a metal carboxylate layer on the surface of the component. The second stage is the decomposition of the metal carboxylate layer to a metal oxide layer and fixation of that layer on the backing or cutting tool surface.

To create an oxide layer which is fixed to the cutting tool surface, it is preferred that there be an interaction between any excess carboxylic acid on the cutting tool and the metal oxide coating formed during the coating process. Optimum oxide layer production (which provides maximum life extension) occurs when the carboxylate decomposition temperature range and the acid evaporation temperature range overlap. That is, when the carboxylate decomposition stage commences, the removal and decomposition of the acid is not complete. Complete removal of the acid prior to the commencement of carboxylate decomposition can significantly reduce or practically eliminate the adhesion of the oxide coating to the cutting tool, and the coating will peel off the substrate completely.

Without wishing to be bound to any particular mechanism, it is believed that the following process occurs during the production of the oxide coating. At high temperatures, it is believed that the carboxylic acid etches or otherwise interacts with the surface of the cutting tool, thereby activating it. This allows interaction between the metal carboxylate and the activated surface of the cutting tool, resulting in the formation of a strong cutting tool-oxide link when the metal carboxylate is subsequently converted into metal oxide.

The heating can be conducted either by placing the coated cutting tool onto a rack or support and then into a furnace, which has been preheated to a desired temperature, or by placing the coated cutting tool into a furnace, followed by heating the furnace to the desired temperature. Any conventional furnace can be used, as no special heating equipment is required, provided, of course, that the furnace will accommodate the size and shape of the component being treated: the surface of the tool must be heated relatively uniformly.

In general, the cutting tool should be heated for a time adequate to produce a uniform oxide coating. For a furnace which has been preheated to a temperature at least about 400° C., a preferred minimum time is about 3 to 5 min. The heat treatment cycle must be long enough to let the carboxylate decompose completely and form the corresponding metal oxide layer on the surface of the cutting tool.

Following heat treatment, the cutting tools may be dipped in a fluorinated acid and solvent solution. This step can be accomplished with any fluorinated acid of general formula $CF_3-(CF_2)_n-COOH$, where n is 5–24. Preferably, the coated tools are dipped in the solution containing perfluorononanoic acid solution. Organofluoric compounds are well preserved by the coating. During the cutting process they help to prevent material being cut from sticking to the cutting tool and provide additional life extension of the tool. Carbohydrates, alcohol, ketones, ether, and organic chlorine compounds can be used as solvents. Ethanol has been found to be particularly suitable as the solvent. After dipping, the tools are taken out to dry. The coated tools can be dried by any known method, but should be allowed to cool to room temperature. Forced air cooling may be used to accelerate the cooling process. The component should not be cooled by treating it with a liquid coolant, as this could damage the coating or the component.

As noted above, while active heating to high temperatures is the preferred method of converting the metal carboxylate to a metal oxide coating, the exposure step can also be carried out in some situations by exposing the cutting tool to ambient air conditions for sufficient time to fix the metal oxide coating to the cutting tool. This time is generally substantially longer than the time required for active heating.

The present process is carried out in a normal, i.e. ambient atmosphere. Accordingly, there is no need to provide any special atmosphere in the furnace during the heating process. However, should it be desired, the present process can also be conducted in specialized atmospheres. If a specialized atmosphere is used, it is preferably an oxidizing atmosphere, that is, one which is enriched with oxygen.

After pressing, high-alloy steel inserts go through mechanical treatment, grinding, heat treatment and sharpening. These materials contain nickel, chrome, iron and maximum 18% of metal carbide (preferably tungsten). As the tool is used during the metal cutting process, the temperature difference between the metal surface and the cutting tool can go up to 1500° C. This temperature difference is great enough to melt the metal and the cutting edge of the tool. As a result, the melted components adhere to the metal surface or edge of the cutting tool, thereby deforming or fouling it. Such deformity of the surface or edge of the tool increases the motor load on the machine using the cutting tool, and significantly abbreviates the life and hinders the performance of the tool.

The method of the invention prevents or inhibits adherence of the metal being cut to the surface of the cutting tool. The method can be used either during the cutting tool manufacturing process or on the completed cutting tool. The coating process of the invention can be used with any known process for manufacturing cutting tools.

The method of the invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

II. EXAMPLES

The following examples illustrate the application of the present process to the coating of metal cutting tools.

Example 1

Preparation of the Metal Carboxylate

Components utilized in preparation of the metal carboxylate were obtained from the Johnson Matthey Co. (1999–2000) catalog as Alfa Aesar A. The components are the salts of acid and metal. It is necessary to dilute them with pure acid in order to use them in the process. Specifically, 350 grams of 2-ethylhexanoic acid (Stock No. 15419, p. 304) and 15 grams of yttrium 2-ethylhexanoate (Stock No. 36661, p. 820 (powder form)) were put into a heated reactor with a mixer inside. While the components were being stirred, the reactor was heated up to 75 to 80° C. After about an hour, the yttrium 2-ehtylhexanoate had dissolved in the acid completely. The stirred solution was then allowed to cool at room temperature. After the solution had cooled, 15 grams of chromium 2-ethylhexanoate (Stock No. 89304, p. 200) and 560 grams of zirconium 2-ethylhexanoate (Stock No. 39543, p. 839) were added. In addition, 2-ethylhexanoic acid was added until the mass reached 1 kilogram. The solution was then stirred thoroughly for 1–2 minutes at room temperature, making it reading for coating.

Example 2

Preparation of Metal Cutting Tool

Cutting tools covered with protective lubricants require cleansing. Hard-alloy disposable plates made of 15% titanium carbide, 6% cobalt, and 79% tungsten carbide were placed in a metal net-like tray above a boiling carbon tetrachloride solvent to be cleansed (this cleansing process took approximately 10 to 15 minutes.) During the cleansing process, the carbon tetrachloride vapor condensed on the plates, dissolving the oil fouling which then dripped down into the bath.

Example 3

Application of Coating to Metal Cutting Tool

The oven was preheated up to 430–450° C. A metal tray with tools (the same tools and the same cleaning process as in Example 2) was dipped into the bath with the carboxylate solution for a few seconds. It was then taken out and left hanging above the bath for an hour to let the excess liquid drip down into the bath. Then argon was let into the oven with the velocity of 10–15 oven volumes per hour. The tray was put into the oven with the fireproof lid until the emission of the thermolysis products was over. The heat sensor (thermocouple) was placed in the middle of the tray. Upon reaching the temperature of 430° C., the tray was kept in the oven for another 3 minutes. Then the argon flow was turned off, the fireproof lid removed, and the tray was pulled out to cool down to room temperature.

Example 4

Treatment of the Metal Cutting Tool

Twenty-five grams of perfluorononanoic acid were dissolved in 1 liter of ethanol. The solution was stirred thoroughly for 2–3 minutes at room temperature. A tool that was treated as described in Example 3 and cooled down to the room temperature was dipped into the above-mentioned solution for 10 to 15 seconds. It was removed from the solution and allowed to air dry. The treated tool was then used for testing. The purpose of this perfluoroacid is to increase the life of the tool as mentioned above.

Example 5

Testing of the Metal Cutting Tool

Comparative tests for life extension of the cutting tool were done on the coated plates treated as in Example 3, which are designed to grind hard-alloy steel. Five plates were used in each testing cycle. The wear criterion for these plates is a 0.5 millimeter wear on the back surface of the cutting edge. Test results on life extension: standard plates without coating—19.7 minutes versus coated plates—27.4 minutes. In effect, there was a 40% life extension due to the coating technology.

What is claimed is:

1. A method for forming a metal oxide coating on a metal cutting tool, comprising:
   (a) applying a liquid metal carboxylate composition, or a solution thereof, to a metal cutting tool, wherein the liquid metal carboxylate composition comprises a solution of a metal salt of a carboxylic acid in a solvent, and
   (b) exposing the metal cutting tool with the applied liquid carboxylate to an environment that will convert at least some of the metal carboxylates to metal oxides.

2. The method of claim 1, wherein the solvent comprises a carboxylic acid, and further comprising exposing the cutting tool to an environment that will cause vaporization or dissipation of any carboxylic acid solvent.

3. The method of claim 2, wherein the solvent comprises at least one carboxylic acid that corresponds to a carboxylate moiety in the liquid metal carboxylate composition.

4. The method of claim 1, wherein the carboxylic acid is a carboxylic acid having the formula

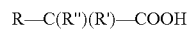

wherein:
   R is selected from H and $C_1$ to $C_{24}$ alkyl groups; and
   R' and R" are each independently selected from H or $C_1$ to $C_{24}$ alkyl groups.

5. The method of claim 4, wherein the carboxylic acid is alpha-branched, wherein at least two of R, R' and R" are not H.

6. The method of claim 5, wherein R is H, R" is $C_2H_5$ and R' is $C_4H_9$.

7. The method of claim 1, wherein the carboxylic acid is a mixture of carboxylic acids.

8. The method of claim 7, wherein the average molecular weight of the acids contained in this mixture is from about 130 to 420.

9. The method of claim 7, wherein the average molecular weight of the acids contained in this mixture is from about 220 to 270.

10. The method of claim 9, wherein the mixture of carboxylic acids contains 2-ethylhexanoic acid as its lowest boiling acid constituent.

11. The method of claim 1, wherein the liquid metal carboxylate composition comprises a mixture of metals.

12. The method of claim 1, wherein the liquid metal carboxylate composition comprises one or more metals selected from the group consisting of Lithium, Beryllium, Sodium, Magnesium, Potassium, Calcium, Scandium, Titanium, Chromium, Manganese, Iron, Nickel, Cobalt, Copper, Zinc, Gallium, Rubidium, Strontium, Yttrium, Zirconium, Silver, Cadmium, Tin, Cesium, Cerium, Barium, Lanthanum, Hafnium, Tantalum, Gold, Thallium, Lead, Bismuth, Cerium, Praseodymium, Neodymium, Samarium, Europium, Gadolinium, Terbium, Dysprosium, Holmium, Erbium, Thulium, Ytterbium, Lutetium, Thorium and Uranium.

13. The method of claim 11, wherein the metal is a mixture comprising:
   from 3% to 10% by weight of yttrium;
   from 2% to 5% by weight of chromium; and
   the balance zirconium.

14. The method of claim 11, wherein the metal is a mixture comprising:
 to 8% by weight of yttrium;
 to 3% by weight of chromium; and
 to 91% by weight of zirconium.

15. The method of claim 2 wherein the vaporization or dissipation of any excess carboxylic acids in the liquid metal carboxylate composition and conversion of the metal carboxylates to metal oxides is carried out by heating the coated cutting tool.

16. The method of claim 15, wherein the cutting tool coated with metal carboxylate is heated to a temperature greater than about 400° C.

17. The method of claim 15, wherein the cutting tool coated with metal carboxylate is heated for about 3 to 5 minutes.

18. The method of claim 1, wherein the amount of metal in the liquid metal carboxylate composition is preferably in the range of 30 to 50 grams of metal per kilogram of liquid metal carboxylate composition.

19. The method of claim 18, wherein the amount of metal in the liquid metal carboxylate composition is 30 to 40 grams of metal per kilogram of liquid metal carboxylate composition.

* * * * *